Oct. 14, 1958
C. KOSTKA
2,855,613
COMBINED TURNING AND THREADING TOOL
Original Filed Oct. 3, 1952
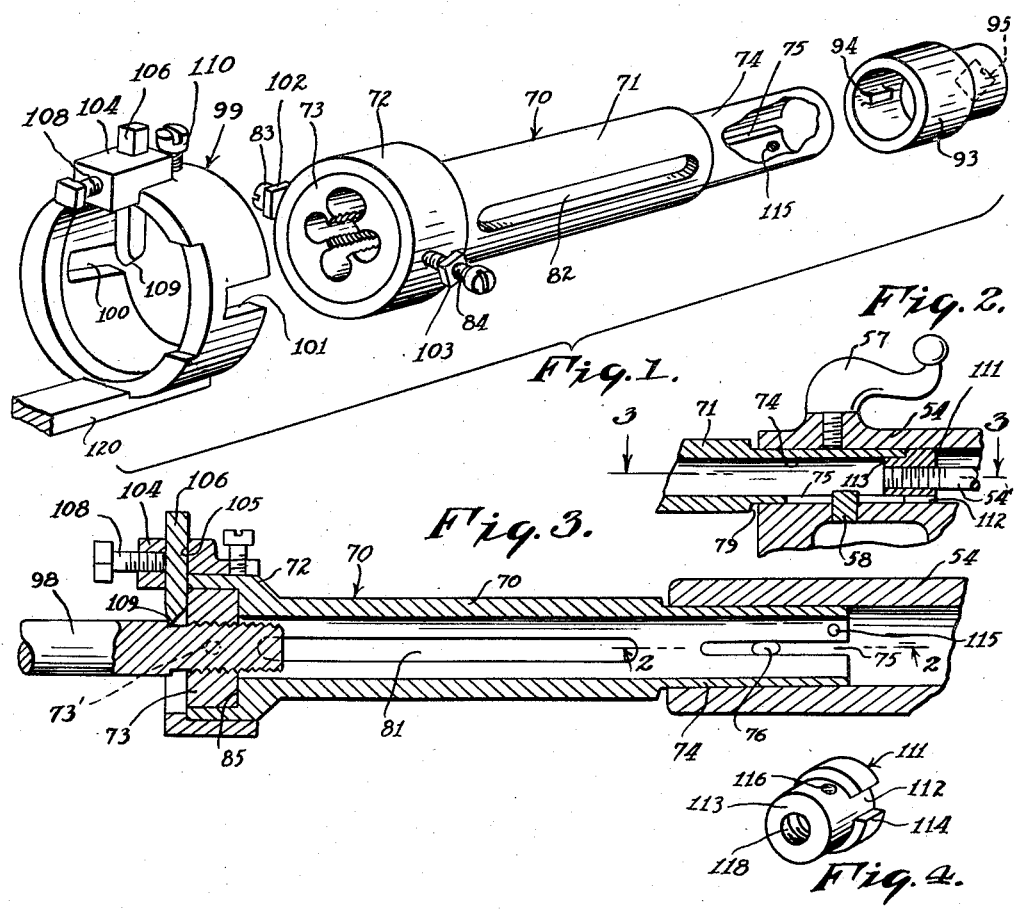
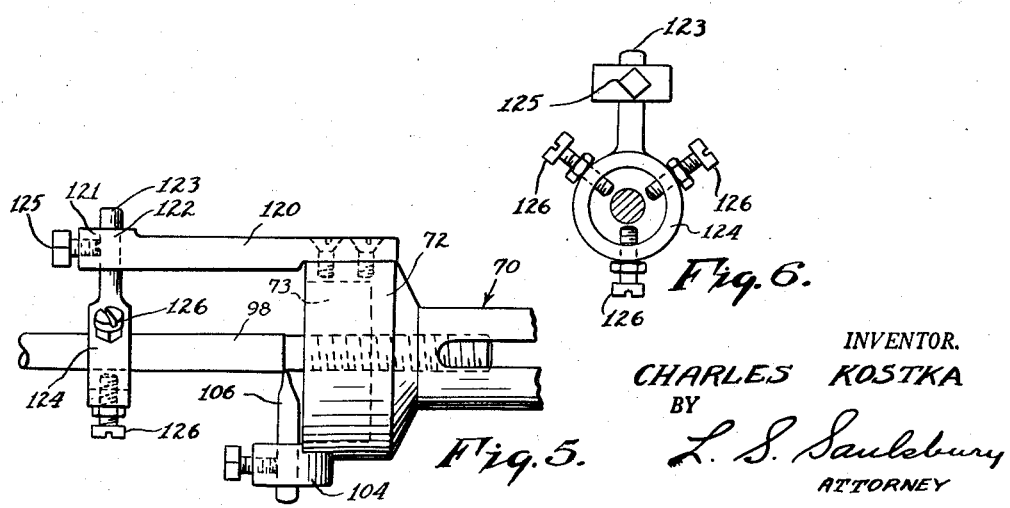
INVENTOR.
CHARLES KOSTKA
BY
L. S. Saulsbury
ATTORNEY

United States Patent Office 2,855,613
Patented Oct. 14, 1958

2,855,613

COMBINED TURNING AND THREADING TOOL

Charles Kostka, Bronx, N. Y.

Continuation of abandoned application, Serial No. 312,990, October 3, 1952. This application December 11, 1952, Serial No. 325,344

2 Claims. (Cl. 10—109)

This invention relates to a die and tap attachment for lathes.

It is a principal object of the present invention to provide a tool holder for holding dies and taps which may be not only operated by a lathe but which may be adapted for use by hand.

It is another object of the present invention to provide a tool holder which has longitudinally-extending elongated slots through which the work may be inspected while the threadings operation is in progress and through which the metal chips will be expelled.

It is still another object of the present invention to provide a tool holder which is adapted to be supported upon and fitted to the tail stock spindle of a lathe and made secure against axial rotation and longitudinal displacement with respect thereto.

It is still another object of the present invention to provide a tool holder which while normally adapted for use with a lathe may quickly and easily be adapted for hand actuation.

It is still another object of the present invention to provide a tool holder which is adapted for die cutting operations but which may be quickly and easily converted or adapted for tapping operations.

It is a further object of the present invention to provide a tool holder for taps and dies of various sizes, which tools may be rapidly interchanged.

It is still a further object of the present invention to provide a tool holder comprising an open-ended sleeve with means at one end for firmly holding a tool, and means at the other end for non-rotatively receiving an insert that may have a hand crank.

It is a still further object of the invention to provide with a die tool holder for lathes a cutting point holder whereby the diameter of the rod can be reduced and provided with a rough thread ahead of the die which cuts the final thread thereon.

It is still a further object of the invention to provide with a die attachment for lathes an adaptor by which the attachment can be adjusted by the tail stock adjusting wheel and screw in order to hand feed the cutting bit against the work when the work is undercut or rough threaded and prior to its engagement with the die.

It is a further object of the invention to provide a cutting bit holder for a die attachment for lathes which has a centering and steadying extension that holds the work piece centralized during the cutting operation of the bit and prior to its engagement with the threading die.

It is a still further object of the present invention to provide a tool holder of the type described which is simple in construction, durable, which is effective for its intended purposes and which can be manufactured and sold at a reasonable cost.

For other objects and for a better understanding of the invention, reference may be had to the following detailed description taken in connection with the accompanying drawings, in which:

Fig. 1 is a collective and perspective view of a holder and of a tool bit adaptor arranged to be fitted on the holder;

Fig. 2 is a fragmentary sectional view taken generally on line 2—2 of Fig. 3 with the holder assembled in the tail end stock;

Fig. 3 is a longitudinal sectional view taken generally on line 3—3 of Fig. 2;

Fig. 4 is a perspective view of an adaptor for the holder by which the holder can be connected to the adjusting screw of the tail end stock;

Fig. 5 is a fragmentary plan view of the cylindrical cutting tool holder showing the centralizing device thereon;

Fig. 6 is an end elevational view of the centralizing device for the tool holder.

This application is a continuation of my application, Serial No. 312,990, filed October 3, 1952, now abandoned.

Referring now to Figs. 1 to 6, there is shown a modified form of the invention. A hollow tool holder 70 has a main body portion 71 with an enlarged hollow end portion 72 on one end for receiving a die 73 or tap holder 42 and with a continuous and reduced sleeve portion 74 on the other end by which the attachment is secured to the tail stock 54. This sleeve portion 74 has a slot 75 cut from its end and is adapted to receive pin 58 of the tail stock 54. The spindle sleeve will have been removed from the stock 54. A clamp handle 57 is tightened to retain the holder against axial displacement. The holder 70 has a shoulder 79 that may serve as a stop to limit the extent to which the reduced portion 74 of the holder is inserted within the tail stock 54. The main body portion 71 of the holder 70 has elongated slots 81 and 82 through which the cutting operation can be observed. The metal cuttings or chips pass through these openings.

The enlarged end portion 72 has two screws 83 and 84 on the respective opposite sides thereof and which engage the periphery of the die 73 or tap holder 42 to hold the same in place when effecting an ordinary cutting operation on the stock piece. Within the end portion 72 is a shoulder 85 against which the inner face of the die 73 will rest. The die 73 has indentations 73' to receive the set screws in order to hold the die from turning. In this manner a die of the small size is accommodated.

If the tool is to be used to thread a stud on an engine block or for a similar operation by hand, an adaptor 93, Fig. 1, is placed on the reduced end portion 74 of the holder. This adaptor 93 has a projection 94 adapted to receive the slot 75 of the reduced end portion 74 of the holder 70. The outer end of the adaptor 93 has a square opening 95 for receiving a square projection of a crank handle. The entire holder 70 with either the small die 73 therein or with the adaptor 86 and large die 88 can be turned to thread the stud.

If it is desired to cut the rod 98 to reduce the diameter of the threaded portion thereof, there is placed upon the enlarged portion 72 a cylindrical cutting tool holder 99. This cutting tool holder has diametrically opposed oversize slots 100 and 101 for receiving the screws 83 and 84 respectively as the tool holder 99 is slid over the enlarged portion 77. Nuts 102 and 103 respectively on the screws 83 and 84 are tightened to hold the tool holder 99 against outward displacement.

The tool holder has an external boss 104 through which extends a square opening 105 in which a cutting bit 106 is extended. A clamping screw 108 in the front end of the boss 104 is tightened to fix the cutting bit 106 in its adjusted position upon the rod stock piece 98. Point 109 of the tool bit 106 is shaped to cut a rough thread as the work piece 98 is turned in the same manner as the work piece 51 is turned by the lathe chuck 53. This cut of the pointed end 109 can be so deep as to effect a considerable reduction in the diameter of the rod 98 or adjusted to make a small cut. A screw 110 also is tightened upon the enlarged end portion 72 whereby to lock the holder 99 in its finally adjusted position. The slots 100 and 101 are wider than the diameter of the screws 83 and 84 to allow the holder 99 to be turned slightly so that the cutting bit can be centralized with respect to the work cutting surface. The tool bit 106 may be sharpened to have the shape or gauge of the desired thread, whereby the tool bit may do the primary cutting of the thread and the die will make the final cut. The tool bit, however, may be sharpened to make a smooth cut from an oversized stock piece and then engage the die for the application of the thread cut. Thus, it will be seen that an oversized stock piece can be cut and threaded in one operation. This same holder 99 can be fitted on the enlarged portion 19 of the holder 10 of the first form of the invention.

In order that the cutting bit can be fed upon the oversized rod and prior to being received by the die, an adaptor 111 is secured to the reduced end portion 74 of the holder, Figs. 2 and 4. The adaptor 111 has a groove 112 that is registered with the end of the slot 75 to accommodate the projection 58 when the attachment is installed in the lathe tail end stock. The adaptor has a reduced portion 113 that fits the opening in the reduced end portion 74 of the holder 70 and is made secure therein by a set screw that enters a countersunk threaded hole 116 in the adaptor 111. With the adaptor 111 fixed in place and the tail stock adjusting screw threaded in a central threaded opening 118 thereof and by turning the adjusting wheel of the tail stock, the holder 70 is fed against the work as in normal lathe operations and the cutting bit will effect the cutting operation. This feeding is done by hand until the cut end of the rod is engaged by the die and thereafter the die will be automatically drawn upon the work as it cuts the threads. Since the tail stock and holder is free to slide on the lathe bed, the die is permitted to be drawn toward the work piece.

In order to keep the work piece rigid and centralized while cutting with the bit 106, the bit holder 99 is provided with a rigid extension 120 which has an enlarged end formation 121. This end formation 121 has a transverse hole 122 through which extends a radial arm 123 of the centering ring 124. This arm is made fixed in the end formation 121 by a set screw 125. The centering ring 124 has three adjustable circumferentially-spaced screws 126 which are adjustable to accommodate the different diameter size stock pieces. The work piece will turn on the ends of these screws 126 and thereby be held against the cutting bit 106 in a steady centralized position.

While various changes may be made in the detail construction, it shall be understood that such changes shall be within the spirit and scope of the present invention, as defined by the appended claims.

What is claimed is:

1. A tool holder comprising a sleeve having a plurality of longitudinal slots intermediate its ends, means at one end of said sleeve for releasably receiving an actuator, and means at the second end of said sleeve for releasably receiving a tool, said tool receiving means including a shoulder at the end of said sleeve, a flange extending outwardly from said shoulder, a pair of diametrically disposed screw means threaded through said flange and a cylindrical tool holder disposed about said flange, each screw means having a nut threaded thereon, said cylindrical tool holder having a pair of slots adapted to receive said diametrically disposed screw means to be held therein by the nuts contacting the tool holder and an outwardly extending boss having an opening to receive a cutting tool and a clamping screw threaded through said boss to secure a tool in the boss opening.

2. A tool holder as defined in claim 1, wherein said cylindrical tool holder has a work centering extension including an outwardly extending rigid arm, a work centering ring fixed on said rigid arm and a plurality of adjustable screws threaded through said work centering ring for sliding engagement with a piece of work.

References Cited in the file of this patent

UNITED STATES PATENTS

| | | |
|---|---|---|
| 313,418 | Guilford | Mar. 3, 1885 |
| 410,601 | Moyle | Sept. 10, 1889 |
| 680,756 | Bond | Aug. 20, 1901 |
| 913,912 | Pflugh | Mar. 2, 1909 |
| 1,526,699 | Duca | Feb. 17, 1925 |
| 1,645,948 | Galloway | Oct. 18, 1927 |
| 1,883,397 | Pealer | Oct. 18, 1932 |
| 1,902,909 | Wheeler | Mar. 28, 1933 |
| 2,159,680 | West | May 23, 1939 |
| 2,273,598 | Shafer | Feb. 17, 1942 |
| 2,383,991 | Sarossy | Sept. 4, 1945 |
| 2,388,290 | Roper | Nov. 6, 1945 |
| 2,567,784 | Ridgeway | Sept. 11, 1951 |
| 2,604,800 | Millholland | July 29, 1952 |

FOREIGN PATENTS

| | | |
|---|---|---|
| 805,033 | Germany | May 4, 1951 |